United States Patent [19]
McDonald

[11] Patent Number: 5,327,265
[45] Date of Patent: Jul. 5, 1994

[54] MODEM ACCESSABLE IMAGE DATABASE SYSTEM FOR ON-DEMAND PRINTING

[76] Inventor: Bruce A. McDonald, 14807 N. 73rd St., #103, Scottsdale, Ariz. 85260

[21] Appl. No.: 877,219

[22] Filed: May 1, 1992

[51] Int. Cl.⁵ .............................................. H04N 1/46
[52] U.S. Cl. .................................... 358/527; 358/444
[58] Field of Search ............... 358/444, 527, 537–538, 358/403, 407, 452–453, 460, 467

[56] References Cited

U.S. PATENT DOCUMENTS

| | | | |
|---|---|---|---|
| 4,999,715 | 3/1991 | Procellio et al. | 358/444 |
| 5,068,745 | 11/1991 | Shimura | 358/444 |
| 5,132,809 | 7/1992 | Kikuchi et al. | 358/444 |
| 5,166,786 | 11/1992 | Sakai et al. | 358/527 |

Primary Examiner—Stephen Brinich
Attorney, Agent, or Firm—Warren F. B. Lindsley

[57] ABSTRACT

A process for electronically producing high quality color brochures and other color documents containing color images and related text material using a personal computer for contacting through telephone lines a print center which has digital optical images stored in both low and high resolution form on optical storage media. Communication with a telecommunication processor of the print center over the telephone lines results in initial optical transmission from the print center to the customer of a low resolution compressed image with printing occuring sequentially at the print center of a high resolution uncompressed image and associated text material.

7 Claims, 1 Drawing Sheet

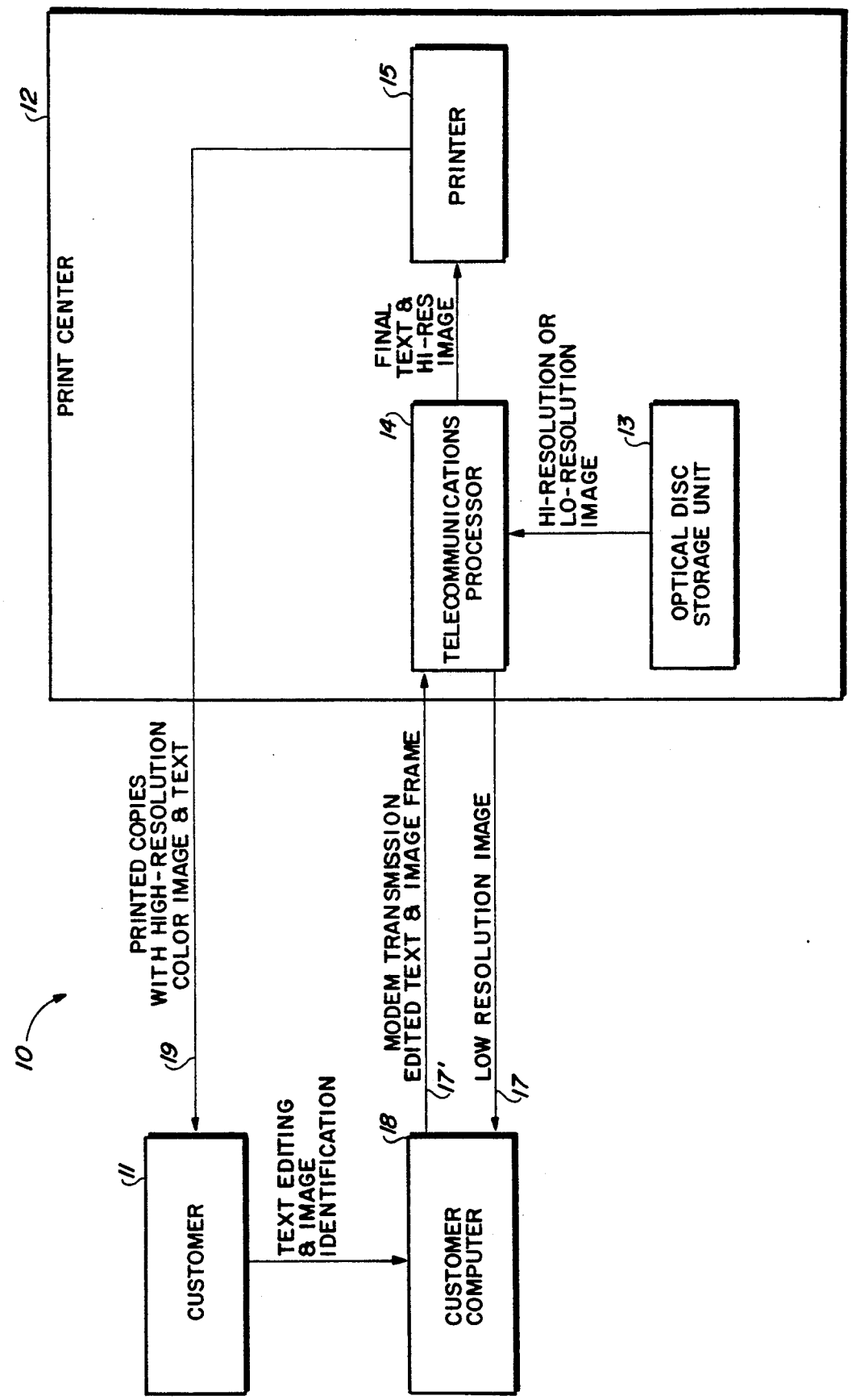

MODEM ACCESSIBLE IMAGE DATABASE SYSTEM FOR ON-DEMAND PRINTING

BACKGROUND OF THE INVENTION

This invention relates to electronic editing and more particularly to editing of integrated color images and related text material of a document over telephone or cellular phone lines connecting a customer with one or more copy centers.

Production of high quality color brochures and other color documents containing text material requires the ability to edit the text material and then integrate it with color images followed by printing of the integrated document without loss of color resolution. Printers capable of producing high quality color printed images at low per copy costs are expensive and are usually not affordable by individuals and small businesses who typically rely on printers at a copy center for their printing needs.

By sharing an expensive, high quality color laser copier among many personal computer users, the cost to produce high quality color printouts can be lowered to levels affordable by most individuals and small businesses.

Remote access to the color laser copier or printer can be accomplished by telephone but this can result in substantial transmission costs since transmitting uncompressed color images over telephone lines usually requires sending millions of bytes of image data over lines having limited transmission capacity. Typically, a color image can require several million bytes of pixel information to accurately represent the image. Commercial phone lines can transmit information at data rates up to a few thousand bytes per second by means of conventional MODEM (modulator demodulator) technology. Hence, a color image containing ten million bytes of pixel information will require ten thousand seconds if a 9600 band MODEM is utilized. This results in almost three hours of transmission time per image. This invention provides the means of producing full color documents at high resolution without having to transmit high resolution color images by telephone.

Within the context of color electronic publishing, the source of color images for integration with text is normally a color scanner, however, any electronic image source can be used. For example, VHS recorders and other video signal sources can be used to provide color images for integration with text material. Video images can be edited, cropped and integrated with text using a color electronic publishing software program, such as recently introduced color versions of PageMaker and Ventura Publisher. Medical, real estate, architect and other professionals can record color images on a video recorder and then when played back, freeze specific images or frames on their PC for later integration within a color document. Uses of color documents produced in this way can range from medical diagnostic reports to real estate sales literature.

One of the newest technologies for creating high resolution color images for incorporation within documents is Kodak's Photo CD technology. Any 35 mm camera can generate very high resolution color images stored on low cost optical media using Kodak's Photo CD technology.

While electronic publishers are now integrating color images with text by means of color scanners and electronic image capture devices, images stored on optical media will soon become a major source of very high quality color images. Kodak's introduction of film to compact disc processing technology permits commercial photographers, personal computer users and virtually anyone with a 35 mm camera to store images on optical media. The market trend in electronic publishing is toward digital image data bases stored on optical media.

Electronic publishers using a personal computer can now access high quality digital images stored on optical media, position the image within their document and have a very high quality copy (or copies) produced on the print center's color laser copier. These images may be user supplied or be selected from stock images already stored on an automated optical disc storage system such as Kodak's Model 560. These optical disc-based image libraries can be accessed by MODEM permitting electronic publishers to search for images for incorporation within their documents. Image searches at low DPI (dots per inch), is a major feature of this invention. The combination of user-accessable image data bases, coupled with high quality, affordable document production will transform print centers into publishing centers which can offer users unique capabilities beyond the scope and affordability of individually owned equipment.

In the present invention, the text of a document may be edited and arranged on a computer video display terminal, combined with a graphic or color image imported at low resolution by telephone transmission from a remote print center having an image database, and the complete document can be printed at high resolution by a color laser copier or printer at the same remote print center.

The means for reducing printing and transmission costs by telephone transmission and subsequent printing of the document at the local print center comprise:
1. Compressing a low resolution version of a color image stored at the print center on one or more optical discs in both high and low resolutions prior to telephone transmissions to the user;
2. The user can then decompress the low resolution image, review that image, and then place the low resolution image within a portion of the document, termed an image frame; and
3. The user then transmits the edited text and image frame to the print center where a high resolution version of the same image is then retrieved from the optical disc storage unit and placed within the image frame.

The advantage of this solution is that the integration of text material and color image can be done completely at the user's location without requiring the additional step of physically transferring a high resolution color image via MODEM. Also, this technique avoids the disadvantage of distortions caused by data compression at levels sufficient to significantly reduce transmission time thereby maintaining high quality resolution in the printed output.

SUMMARY OF THE INVENTION

In accordance with the invention claimed, a new and improved method and apparatus for the preparation of a document comprising text material, integrated with color images, is disclosed. Such documents may be printed with a color laser copier or printer having high resolution print capabilities at reasonable costs.

It is, therefore, one object of this invention to provide a new and improved method and apparatus for integrating edited text material with given color images on a color laser copier or printer.

Another object of this invention is to provide a new and improved apparatus for printing a document comprising color images with text material which is edited at the user's computer terminal and then transmitted to a color laser copier or printer over telephone lines where it is integrated with color images and then printed by a high resolution color laser copier or printer.

Another object of this invention is to provide apparatus for printing a document wherein an image frame and related text material are transmitted by a user to and from a copy center with the color image placed within the image frame and integrated with text material by the copy center prior to printing at the copy center by its color laser copier or printer.

A further understanding of the nature and advantages of the present invention will be gained by reference to the following portions of the specifications and the appended drawing.

BRIEF DESCRIPTION OF THE DRAWING

FIG. 1 is a block diagram of a document editing system for text material that is integrated with a color image at a copy center and then printed with a color laser copier or printer.

DESCRIPTION OF THE PREFERRED EMBODIMENT

Referring more particularly to the drawing by characters of reference, FIG. 1 discloses a system configuration utilizing graphic communicator software at both the user's site and at the print center. This system comprises a user's personal computer running the graphic communicator and communicating with a computer at the print center which operates a print center version of the graphic communicator. The print center's computer is connected to a color laser copier. This communication either can be directed to the print center over a local telephone line, cellular phone or via a telephone accessible satellite communications link.

The print center's computer, termed the telecommunications processor (TP), provides the communication data link to the user's personal computer. The uniqueness of the TP system operation lies in the electronic mirror editing (EME) technology. EME is an innovative, real time color document editing system permitting full color, 24-bit image files to be remotely accessed and edited by MODEM. Before printing the document on the color laser copier, an image can be captured from an optical data base and be returned via MODEM from the TP to the user for review. After final editing and user approval, the document is printed in full color with as many copies as requested by the user. Reference is made to U.S. patent application Ser. No. 07/786,705 filed Nov. 11, 1991 and entitled "Document Image Revision" which is incorporated herein by reference.

The TP at the print center provides data communication; image selection, compression, and decompression; and text and image integration running under any one of several electronic publishing software applications, such as Ventura Publisher or PageMaker. The TP provides all EME functions, as well as job control for the print center, including customer billing, document storage, user access authorization and remote transaction billing. With reference to the details of EME, reference is made to U.S. patent application Ser. No. 07/786,705 referred to above.

The copy center's telecommunication processor (TP) can be accessed by the user to retrieve a low dot per inch (DPI) full color version of the image via MODEM, for review and storage in the user's PC.

It should be noted that the telecommunication processor (TP) is a microcomputer containing magnetic storage devices, color display terminal, keyboard, MODEM, desktop publishing software, telecommunication software required to receive, edit and transmit images and text to and from the customer's remote PC and transfer the documents ready for printing to the color laser copier or color printer. The TP can access an optical disc storage unit at the print center which disc storage unit contains one or more CD-ROM discs onto which have been written both high and low resolution color images. These images may have been supplied by the customer or be stock images supplied by third parties.

Both the customer's personal computer and telecommunication processor contain a MODEM so that both computers can communicate with one another over an ordinary telephone line.

The user or customer, in creating the page layout of the document to be printed, dials the telecommunication processor at the copy center and requests that a compressed version of a particular color image stored on CD-ROM within the optical disc storage unit, connected to the telecommunication processor, be sent to his personal computer via the MODEM telephone connection. Once received at the customer's personal computer, the color image can be positioned on the page layout, cropped, stretched or otherwise modified. Text material can be added on the same page of the document utilizing any number of software applications for desktop publishing. The final page layout, with an image frame but without the actual image, is then transmitted over the telephone lines back to the telecommunication processor at the copy center.

Each page of the document to be printed is prepared in this way with back and forth transmission of an image frame and text material between the user and the telecommunication processor at the copy center as frequently as necessary.

Since the editing function normally requires only positioning and cropping, low resolution editing versions are used to speed the transmission and editing process. This ability to perform real time online editing of the page layout is dubbed "electronic mirror editing".

The actual printing of the document occurs at high resolution (400 DPI) at the copy center once the user has released the document for production. This is accomplished by substituting a high resolution version (high dots per inch) of the image selected from CD-ROM by the customer for the low DPI version of that same image prior to printing the document page.

In summary, the disclosed system offers the convenience of low cost, fast remote telephone editing while retaining a high level of color image and text quality in the printed copy.

FIG. 1 discloses a block diagram 10 of the above disclosure wherein a customer 11 can request a print center 12 to select a particular image from the optical disc storage unit 13. The TP 14 at the print center 12 retrieves a low DPI version of the selected image from the optical disc storage unit 13. The TP compresses this low DPI version of the image and transmits via telephone lines 17, 17' to the customer's computer 18 which then decompresses the selected image and displays the low DPI image on the customer's computer.

Each page of a printed document is prepared this way with back and forth transmission of an image frame, a low DPI version of the image to be contained in the image frame, and text material between the user and the telecommunication processor 14 at the copy center as frequently as necessary.

Continued changes by the customer and the return of further mock-ups may continue over the telephone lines 17, 17' and by the customer and copy center until the document is approved by the customer after which the approved mock-up is printed by the color laser copier or printer 15 with a high DPI version of the color image substituted for the low DPI version.

The full colored document printed by color laser copier or printer 15 is then delivered to customer 11 as evident by line 19 of FIG. 1.

It should be noted that the drawing illustrates a plurality of telephone lines used to implement the novel hardware and functions disclosed. However, only one telephone line may be used to fully implement the disclosed invention, if so desired, and still fall within the scope of the claimed invention. A cellular phone may also be used to communicate with the print center.

The invention has now been described with reference to a specific embodiment. Various modifications and substitutions will be apparent to persons skilled in the relavent arts. Accordingly, it is not intended that the invention be limited to the specific embodiment described herein, but is defined by the appended claims.

What is claimed is:

1. A process for electronically editing and printing a document containing text and color images comprising the steps of:

transmitting upon request from a customer a low resolution color image from a copy center's optical disc through a telecommunication processor and over telephone lines to a customer's computer, transmitting by customer's computer to the telecommunication processor text material and an image frame with the size and position of said frame being correlated with the low resolution color image received from the telecommunication processor, and printing said document comprising said text material with a high resolution version of said color image retrieved from said optical disc in said frame by a color laser copier or printer in said copy center.

2. The process for electronically editing and printing a document set forth in claim 1 wherein: said request to said copy center to transmit a low resolution compressed color image to said telecommunication processor is transmitted by a customer's computer over a telephone line.

3. The process for electronically editing and printing a document set forth in claim 1 in further combination with:

said optical disc comprising a CD-ROM memory.

4. The process for electronically editing and printing a document set forth in claim 3 wherein:

said CD-ROM contains high and low resolution optical images with said low resolution images being compressed and transmitted selectively to the customer and said high resolution optical image of the same image being transmitted to said laser copier or printer for incorporation in said frame of said document for printing purposes.

5. An apparatus for electronically editing and printing a document containing text material and one or more color images comprising:

a customer's computer, a print center interconnected with said customer's computer through telephone lines or cellular phone, said print center comprising a telecommunication processor, an optical disc storage unit containing high and low resolution versions of each optical image stored and a printer, signal means for causing said customer's computer to communicate with said processor for transmitting a low resolution image from said optical disc storage unit to said customer's computer, a first means for causing said customer's computer to arrange text material and a frame for said low resolution image in a customer selected document layout, a second means for causing said customer's computer to transmit said document layout including said frame minus said low resolution image to said print center, and a third means for causing said processor to retrieve from said optical disc storage unit said high resolution image corresponding to said low resolution image transmitted to said customer's computer for insertion within said frame, and printer means for printing said document with said high resolution optical image in said frame and the associated text material.

6. The apparatus set forth in claim 5 wherein: said printer means comprises a laser printer.

7. The apparatus set forth in claim 5 in further combination with:

a cellular phone for communicating with said customer's computer.

* * * * *